Patented Aug. 14, 1928.

1,680,862

UNITED STATES PATENT OFFICE.

HAROLD E. CUDE, OF FLORAL PARK, NEW YORK, ASSIGNOR TO THE NAUGATUCK CHEMICAL COMPANY, OF NAUGATUCK, CONNECTICUT, A CORPORATION OF CONNECTICUT.

METHOD OF TREATING RUBBER AND PRODUCT.

No Drawing. Application filed May 27, 1927. Serial No. 194,847.

This invention relates to a method of treating rubber and to the product obtained, more particularly to a method of obtaining from solid rubber a plastic substance directly miscible with aqueous material, and to the resulting product.

The usual method employed for treating solid unvulcanized rubber to obtain a plastic product capable of being calendered or otherwise distributed in desired form is to plasticize the rubber on the usual mills by the aid of heat, and aqueous dispersions have also been made from solid unvulcanized rubber by first dissolving it in an organic solvent and then dispersing the cement or solution thus obtained in water, but as far as I am aware, no method has been previously known for forming, without the aid of organic solvents, a plastic mass of either unvulcanized or vulcanized rubber capable of use directly as such either hot or cold, and also directly miscible with aqueous material to form a dispersion.

An object of the present invention is to provide a method for treating rubber, either unvulcanized, vulcanized or reclaimed, to form a mass which is plastic either hot or cold and which is directly miscible with water to form a dispersion.

Other objects will appear from the detailed description and claims.

The invention comprises broadly comminuting a mass of rubber, either unvulcanized or containing combined sulphur, treating it with an organic acid capable of forming a water soluble soap, with the assistance of agitation or heat or both, until the mass assumes a plastic putty-like consistency, neutralizing residual acidity with a base, which may be in quantity sufficient to render the product slightly alkaline, and when desired directly mixing the resulting product with aqueous material to form a dispersion. It also comprises the products obtained.

In one specific embodiment the invention may be carried out as follows: 100 parts comminuted vulcanized rubber, which may be of any suitable character, for instance ground inner tubes, is placed in a vessel such as a mixer of the Werner and Pfleiderer type, maintained at about 212° F., and to the rubber is added about 25 parts of a mineral oil mixture containing an acidic substance, said substance being capable of forming a water soluble soap. The mixture is agitated for a period of about four hours, at the end of which time it has assumed a homogeneous plastic putty-like consistency free from any particles of the ground rubber or uncombined oil. There is then added to the mass while still hot about 12 to 15 parts of caustic soda to 100 parts of rubber, sufficient alkali being added to neutralize the residual acid in the mass and preferably to leave it slightly alkaline. The neutralization can be accomplished by stirring for 5 to 10 minutes. The resulting product is a plastic mass which is of putty-like consistency either hot or at lower temperatures, which is capable of being extruded, made into a spreading compound, and used in various other ways, such as for the purposes of an ordinary reclaimed rubber. If a dispersion of the vulcanized rubber is desired, all that is necessary is to add water or other aqueous material such as rubber latex, directly to the plastic product with stirring, the amount and nature of the aqueous material to be added being governed by the consistency and other properties desired in the finished dispersion.

Instead of using the mineral oil above described, 10 parts of oleic or stearic acid, 20 parts of pine tar, 20 parts of white pine pitch or 15 parts of pine oil may be used. There may also be used sulphonated oils or greases or any saponifiable acidic distillate or residuum of the distillation of resinous woods. Other fatty acids may also be used. In general any organic acid capable of forming a water soluble soap may be used, or substances containing such an acid provided they are otherwise suitable for the purpose. Instead of caustic soda, any other caustic alkali or base capable of forming a water soluble soap may be used. It is not essential that heat be used in the process as the mixing may be carried out in the cold, and any suitable mixer, such as the Werner and Pfleiderer, may be used for carrying out the process. The agitation is also not essential if the mixture be heated and in this case the treatment with the acidic material may be carried out in an ordinary vulcanizer and the subsequent neutralization accomplished in a suitable mixer. Instead of vulcanized rubber, unvulcanized rubber may be used with suitable changes in the proportions of the acidic and alkaline materials used and in the time allowed for the operation. The process has been successfully carried out with pale crepe, smoked sheet and spray dried rubbers, and it has also been successfully applied to an ordinary reclaimed rubber. The process may be carried out using mixtures of any two or more of the raw, vulcanized or reclaimed rubbers, or if desired two or more of these materials may be first subjected to the process and then mixed, or separate dispersions of these may be mixed. If the reaction with the acidic material has been carried out with the assistance of heat, the alkali may be added either to the hot material or after it has been cooled, and when a dispersion is to be made from the product, the mixing with aqueous material may be carried out while the mass is still hot or after it has cooled.

It will be seen that by my invention a method has been devised by which either unvulcanized rubber or rubber containing combined sulphur may be obtained in a plastic putty-like form which remains plastic either hot or at lower temperatures and which can be applied to various uses in its plastic form or directly mixed with aqueous material to form a dispersion. Such a dispersion when made from vulcanized solid rubber or from reclaimed rubber may be added to natural rubber latex for the purpose of modifying the properties of the latex or for cheapening, and the dispersions themselves are capable of wide use as will be obvious to those skilled in the art. If considerable amounts of oils, pine tar and other such materials have been used in forming the product, the dispersion produced is tacky and adhesive and can be used as a cement, for coating adhesive tape, friction fabric, ship caulking, etc. By reducing the amounts of mineral oil or pine tar used and substituting a vegetable oil, such as corn oil, the tackiness or adhesiveness can be reduced so as to produce a dispersion capable of use where tackiness or adhesiveness is not desired, for instance, carpet backing and spread goods in general.

In case vulcanization of the finished article is desired, the introduction of vulcanizing ingredients and the vulcanizing step may be accomplished at any suitable time. For instance, vulcanizing ingredients may be added to the finished plastic putty-like mass and after this has been disposed in the desired shape vulcanization may be accomplished by any of the usual heat curing methods, or if a low temperature vulcanizing combination has been added the material may be vulcanized at low temperatures.

If dispersions are to be made from the plastic mass the vulcanizing ingredients may be added as before or directly to the dispersion. If desired, vulcanization may be carried on while in the form of a dispersion.

It will be obvious to those skilled in the art that the invention is capable of wide use and many modifications and it is therefore not desired to limit it otherwise than as is required by the prior art.

Having thus described my invention, what I claim and desire to protect by Letters Patent is:

1. The method of treating rubber which comprises, comminuting the rubber, treating it with an organic acid capable of forming a water soluble soap until the mass has assumed a putty-like consistency, and neutralizing the residual acidity with a base capable of forming a water soluble soap.

2. The method of treating rubber containing sulphur in combined form which comprises, comminuting the rubber, treating it with an organic acid capable of forming a water soluble soap until the mass has assumed a putty-like consistency, and neutralizing the residual acidity with a base capable of forming a water soluble soap.

3. The method of treating rubber which comprises comminuting the rubber, treating it in the presence of heat with an organic acid capable of forming a water soluble soap until the mass has assumed a putty-like consistency, and neutralizing the residual acidity with an alkali.

4. The method of treating rubber containing sulphur in combined form which comprises, comminuting the rubber, treating it in the presence of heat with an organic acid capable of forming a water soluble soap until the mass has assumed a putty-like consistency, and neutralizing the residual acidity with an alkali.

5. The method of treating rubber which comprises, comminuting the rubber, agitating it in the presence of heat with an organic acid capable of forming a water soluble soap until the mass has assumed a putty-like consistency, and neutralizing the residual acidity with caustic soda.

6. The method of treating rubber containing sulphur in combined form which comprises, comminuting the rubber, agitating it in the presence of heat with an organic acid capable of forming a water soluble soap until the mass has assumed a putty-like consistency, and neutralizing the residual acidity with caustic soda.

7. The method of treating rubber which comprises, comminuting the rubber, treating it with an organic acid capable of forming a water soluble soap until the mass has assumed a putty-like consistency, neutralizing the residual acidity with a base capable of forming a water soluble soap, and directly mixing the product with aqueous material to form a dispersion.

8. The method of treating rubber containing sulphur in combined form which comprises, comminuting the rubber, treating it with an organic acid capable of forming a water soluble soap until the mass has assumed a putty-like consistency, neutralizing the residual acidity with a base capable of forming a water soluble soap, and directly mixing the product with aqueous material to form a dispersion.

9. The method of treating rubber which comprises, comminuting the rubber, agitating it in the presence of heat with an organic acid capable of forming a water soluble soap until the mass has assumed a putty-like consistency, neutralizing the residual acidity with a caustic alkali, and directly mixing the heated product with aqueous material to form a dispersion.

10. The method of treating rubber which comprises, comminuting the rubber, treating it with a free fatty acid until the mass assumes a putty-like consistency, and neutralizing the residual acidity with a base capable of forming a soluble soap with the acid.

11. The method of treating rubber which comprises, comminuting the rubber, treating it with an acidic product of the distillation of resinous ligneous matter until the mass has assumed a putty-like consistency, and neutralizing the residual acidity with a base capable of forming a soluble soap with the acid.

12. The method of treating rubber which comprises, comminuting the rubber, treating it with an organic acid capable of forming a water soluble soap until the mass has assumed a putty-like consistency, neutralizing residual acidity with sufficient base to render the product slightly alkaline, said base being capable of forming a water soluble soap, and directly mixing with water to form a dispersion.

13. The method of treating rubber which comprises, comminuting the rubber, agitating it in the presence of heat with an organic acid capable of forming a water soluble soap until the mass has assumed a putty-like consistency, neutralizing acidity with an alkali hydroxide in quantity sufficient to render the product slightly alkaline, and directly mixing with water to form a dispersion.

14. The method of treating rubber which comprises, comminuting the rubber, agitating it in the presence of heat with an organic acid capable of forming a water soluble soap until the mass has assumed a putty-like consistency, neutralizing residual acidity of the heated product with a slight excess of caustic soda, and directly mixing the heated material with water to form a dispersion.

15. As a new article of manufacture, the plastic putty-like reaction product of vulcanized rubber, an organic acid capable of forming a water soluble soap, and a base capable of forming a water soluble soap.

16. As a new article of manufacture, the plastic putty-like mass of comminuted vulcanized rubber containing the reaction product of an organic acid capable of forming a water soluble soap, and caustic soda.

Signed at New York, county and State of New York, this 21st day of May, 1927.

HAROLD E. CUDE.